US012597985B2

(12) United States Patent
Petersson et al.

(10) Patent No.: US 12,597,985 B2
(45) Date of Patent: Apr. 7, 2026

(54) COMMUNICATION USING A DUAL POLARIZED ANTENNA ARRAY

(71) Applicant: Telefonaktiebolaget LM Ericsson (publ), Stockholm (SE)

(72) Inventors: Sven Petersson, Sävedalen (SE); Fredrik Athley, Västra Frölunda (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 189 days.

(21) Appl. No.: 18/034,629

(22) PCT Filed: Oct. 30, 2020

(86) PCT No.: PCT/EP2020/080514
§ 371 (c)(1),
(2) Date: Apr. 28, 2023

(87) PCT Pub. No.: WO2022/089756
PCT Pub. Date: May 5, 2022

(65) Prior Publication Data
US 2023/0403065 A1 Dec. 14, 2023

(51) Int. Cl.
*H04B 7/0408* (2017.01)
*H04B 7/10* (2017.01)
*H04W 52/42* (2009.01)

(52) U.S. Cl.
CPC ............. *H04B 7/10* (2013.01); *H04B 7/0408* (2013.01); *H04W 52/42* (2013.01)

(58) Field of Classification Search
CPC ............ H01Q 3/24; H01Q 3/26; H01Q 21/00; H01Q 21/06; H01Q 21/24; H01Q 21/29;
(Continued)

(56) References Cited

U.S. PATENT DOCUMENTS

| | | | |
|---|---|---|---|
| 6,512,480 B1 | 1/2003 | Reudink | |
| 2016/0301458 A1* | 10/2016 | Petersson | H01Q 21/26 |

(Continued)

FOREIGN PATENT DOCUMENTS

| | | |
|---|---|---|
| CN | 110915148 A | 3/2020 |
| JP | 2001-513969 A | 9/2001 |

(Continued)

OTHER PUBLICATIONS

International Search Report and Written Opinion dated Jul. 9, 2021 issued in International Patent Application No. PCT/EP2020/080514 (11 pages).

(Continued)

*Primary Examiner* — Shawkat M Ali
(74) *Attorney, Agent, or Firm* — Rothwell, Figg, Ernst & Manbeck, P.C.

(57) ABSTRACT

There is provided mechanisms for communication in a wireless access network using a dual polarized antenna array. The antenna array comprises antenna elements of a first polarization and of a second polarization. A method comprises transmitting a first signal via a transmit antenna port in a transmit beam on a first link of the wireless access network. The transmit antenna port is connected to the antenna elements of both the first polarization and the second polarization. The method comprises receiving a second signal on a second link of the wireless access network via a first receive antenna port in a first receive beam and via a second receive antenna port in a second receive beam. The first receive antenna port is connected to antenna elements of the first polarization and the second receive antenna port is connected to antenna elements of the second polarization. The receive beams and the transmit beam fulfil an overlap criterion with respect to their total power patterns.

18 Claims, 6 Drawing Sheets

(58) Field of Classification Search
CPC . H01Q 25/00; H04B 7/00; H04B 7/01; H04B 7/04; H04B 7/06; H04B 7/08; H04B 7/10; H04B 7/0408; H04B 7/0456; H04W 16/28; H04W 52/42; H04W 72/12
USPC ........ 342/173, 361, 367, 374; 375/219, 260, 375/267, 295, 316
See application file for complete search history.

(56) References Cited

U.S. PATENT DOCUMENTS

| | | | |
|---|---|---|---|
| 2017/0310376 A1* | 10/2017 | Järmyr ................ | H04B 7/0456 |
| 2018/0183509 A1 | 6/2018 | Luo et al. | |
| 2019/0020123 A1* | 1/2019 | Petersson ............ | H01Q 25/001 |
| 2021/0105046 A1* | 4/2021 | Gutman .............. | H04W 72/541 |

FOREIGN PATENT DOCUMENTS

| | | |
|---|---|---|
| JP | 2019-071644 A | 5/2019 |
| WO | 98/39851 A1 | 9/1998 |
| WO | 2021228376 A1 | 11/2021 |

OTHER PUBLICATIONS

International Preliminary Report on Patentability dated Dec. 6, 2022 issued in International Patent Application No. PCT/EP2020/080514 (9 pages).
Qualcomm, "Breaking the wireless barriers to mobilize 5G NR mmWave", Jan. 2019 (39 pages).

* cited by examiner

S102
Configure antenna array to provide tranmsit antenna port

S104
Transmit first signal

S106
Configure antenna array to provide receive antenna ports

S108
Receive second signal

S110
Combine signal as received via receive antenna ports

COMMUNICATION USING A DUAL POLARIZED ANTENNA ARRAY

CROSS REFERENCE TO RELATED APPLICATIONS

This application is a 35 U.S.C. § 371 National Stage of International Patent Application No. PCT/EP2020/080514, filed Oct. 30, 2020.

TECHNICAL FIELD

Embodiments presented herein relate to a method, an antenna array control unit, a computer program, and a computer program product for communication in a wireless access network using a dual polarized antenna array.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node at the network side and at the user nodes at the user side might be required to reach a sufficient link budget.

At mmW frequencies the beams generated from a panel antenna can be made very narrow, thus forming so-called pencil beams. This may be required for sufficient data transmission/reception (Tx/Rx) performance. However, transmitting cell-defining reference signals, such as a synchronization signal block (SSB) with such narrow beams can lead to large delays in initial network access, mobility, and beam management procedures. This since a large number of narrow beams is required to cover the cell. It can thus take long time to find the best narrow beam. Therefore, wider beams are, at least sometimes, used for the transmission of cell-defining reference signals.

However, there could be difficulties to generate such wide beams, as well as other beams, that are suitable for both transmission and reception of signals.

SUMMARY

An object of embodiments herein is to provide techniques for efficient generation of wide beams, as well as other beams, that are suitable for both transmission and reception of signals.

According to a first aspect there is presented a method for communication in a wireless access network using a dual polarized antenna array. The antenna array comprises antenna elements of a first polarization and of a second polarization. The method comprises transmitting a first signal via a transmit antenna port in a transmit beam on a first link of the wireless access network. The transmit antenna port is connected to the antenna elements of both the first polarization and the second polarization. The method comprises receiving a second signal on a second link of the wireless access network via a first receive antenna port in a first receive beam and via a second receive antenna port in a second receive beam. The first receive antenna port is connected to antenna elements of the first polarization and the second receive antenna port is connected to antenna elements of the second polarization. The receive beams and the transmit beam 150a fulfil an overlap criterion with respect to their total power patterns.

According to a second aspect there is presented an antenna array control unit for communication in a wireless access network using a dual polarized antenna array. The antenna array comprises antenna elements of a first polarization and of a second polarization. The antenna array control unit comprises processing circuitry. The processing circuitry is configured to cause the antenna array control unit to transmit a first signal via a transmit antenna port in a transmit beam on a first link of the wireless access network. The transmit antenna port is connected to the antenna elements of both the first polarization and the second polarization. The processing circuitry is configured to cause the antenna array control unit to receive a second signal on a second link of the wireless access network via a first receive antenna port in a first receive beam and via a second receive antenna port in a second receive beam. The first receive antenna port is connected to antenna elements of the first polarization and the second receive antenna port is connected to antenna elements of the second polarization. The receive beams and the transmit beam fulfil an overlap criterion with respect to their total power patterns.

According to a third aspect there is presented an antenna array control unit for communication in a wireless access network using a dual polarized antenna array. The antenna array comprises antenna elements of a first polarization and of a second polarization. The antenna array control unit comprises a transmit module configured to transmit a first signal via a transmit antenna port in a transmit beam on a first link of the wireless access network. The transmit antenna port is connected to the antenna elements of both the first polarization and the second polarization. The antenna array control unit comprises a receive module configured to receive a second signal on a second link of the wireless access network via a first receive antenna port in a first receive beam and via a second receive antenna port in a second receive beam. The first receive antenna port is connected to antenna elements of the first polarization and the second receive antenna port is connected to antenna elements of the second polarization The receive beams and the transmit beam fulfil an overlap criterion with respect to their total power patterns.

According to a fourth aspect there is presented a computer program for communication in a wireless access network using a dual polarized antenna array, the computer program comprising computer program code which, when run on an antenna array control unit, causes the antenna array control unit to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects simplify the generate of wide beams, as well as other beams, that are suitable for both transmission and reception of signals.

Advantageously, using dual polarization beamforming for transmission enables high power efficiency and low antenna gain ripple.

Advantageously, using single polarization beamforming for reception enables polarization diversity.

Advantageously, these aspects enable the benefits of using dual polarization beamforming for transmission to be combined with the benefits of using single polarization beamforming for reception.

Advantageously, these aspects enable full output power to be used for the transmission of reference signals whilst maintaining a matching between beam shapes used for transmission and reception.

Advantageously, these aspects enable two receive antenna ports with orthogonal polarization to be used for diversity reception without any requirement on that a receive antenna port should be connected to antenna elements of both polarizations.

Advantageously, these aspects enable cell-defining reference signals to be transmitted in wide beams, thus resulting in increased cell coverage.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to mechanisms for communication in a wireless access network using a dual polarized antenna array. In order to obtain such mechanisms there is provided an antenna array control unit, a method performed by the antenna array control unit, a computer program product comprising code, for example in the form of a computer program, that when run on an antenna array control unit, causes the antenna array control unit to perform the method.

Figure 1:
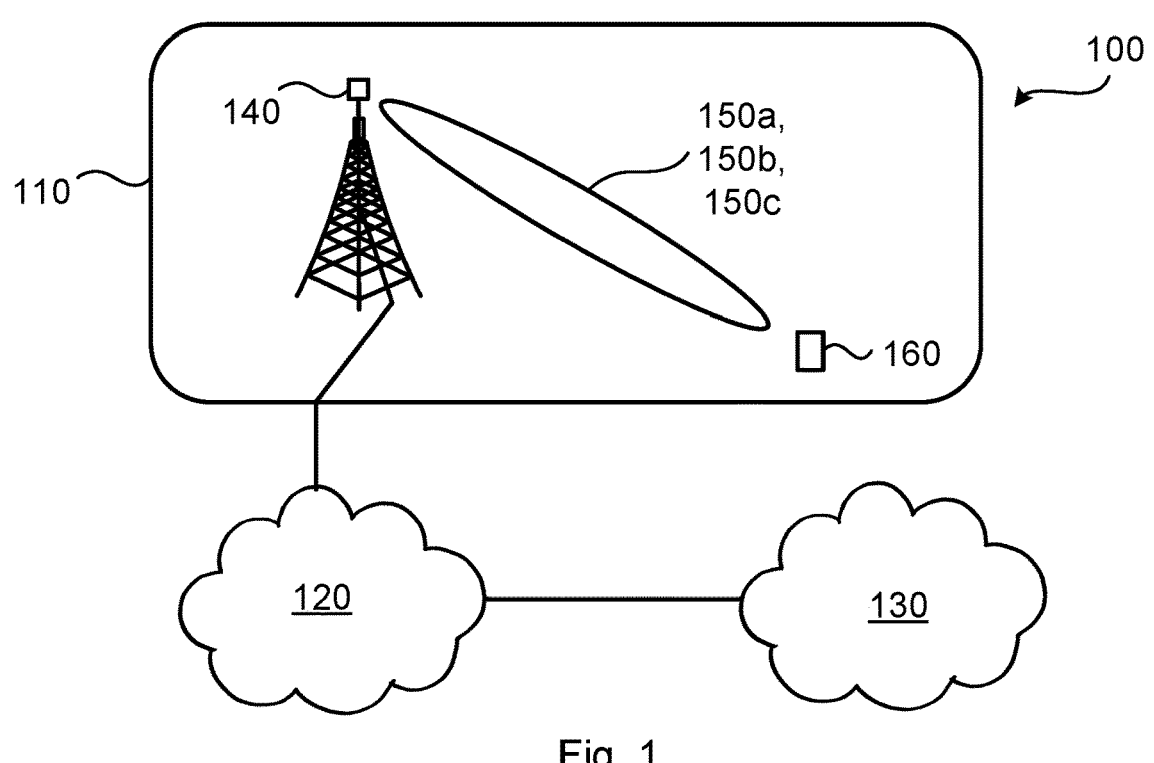
FIG. 1 is a schematic diagram illustrating a wireless access network according to embodiments.

FIG. 1 is a schematic diagram illustrating a wireless access network 100 where embodiments presented herein can be applied. The wireless access network 100 could be a third generation (3G) telecommunications network, a fourth generation (4G) telecommunications network, a fifth generation (5G) telecommunications network, or any evolvement thereof, and support any 3GPP telecommunications standard, where applicable.

The wireless access network 100 comprises a (radio) access node 140 configured to provide network access to user nodes, as represented by user node 160, in a (radio) access network 110. The access network 110 is operatively connected to a core network 120. The core network 120 is in turn operatively connected to a service network 130, such as the Internet. The user node 160 is thereby enabled to, via the access node 140, access services of, and exchange data with, the service network 130. The access node 140 and the user node 160 are configured to communicate with each other in beams 150a, 150b, 150c.

Examples of access nodes 140 are, radio base stations, base transceiver stations, Node Bs, evolved Node Bs, gNBs, access points, access nodes, and integrated access an backhaul nodes. Examples of user nodes 160 are wireless devices, terminal devices, mobile stations, mobile phones, handsets, wireless local loop phones, user equipment (UE), smartphones, laptop computers, tablet computers, network equipped sensors, network equipped vehicles, wearable electronic devices, and so-called Internet of Things devices.

In this respect, the typical antenna architecture of a access node 140 for mmWave consists of a few antenna arrays oriented in different directions. Some antenna arrays have antenna elements with orthogonal polarizations, enabling the use of dual polarization beamforming. The access node 140 might then be configured to switch between the different antenna arrays and/or within each antenna array when analog beamforming is performed. However, in practical use, such an access node 140 might not use full power when transmitting in wide beams. This might be due to that some PAs are switched off or that single polarization with amplitude tapering is used. According to the embodiments disclosed herein, the access node 140 could transmit in wide beams whilst using full output power, thereby increasing the coverage compared to using amplitude tapering or transmitting on only a subset of its antenna elements.

Figure 2:
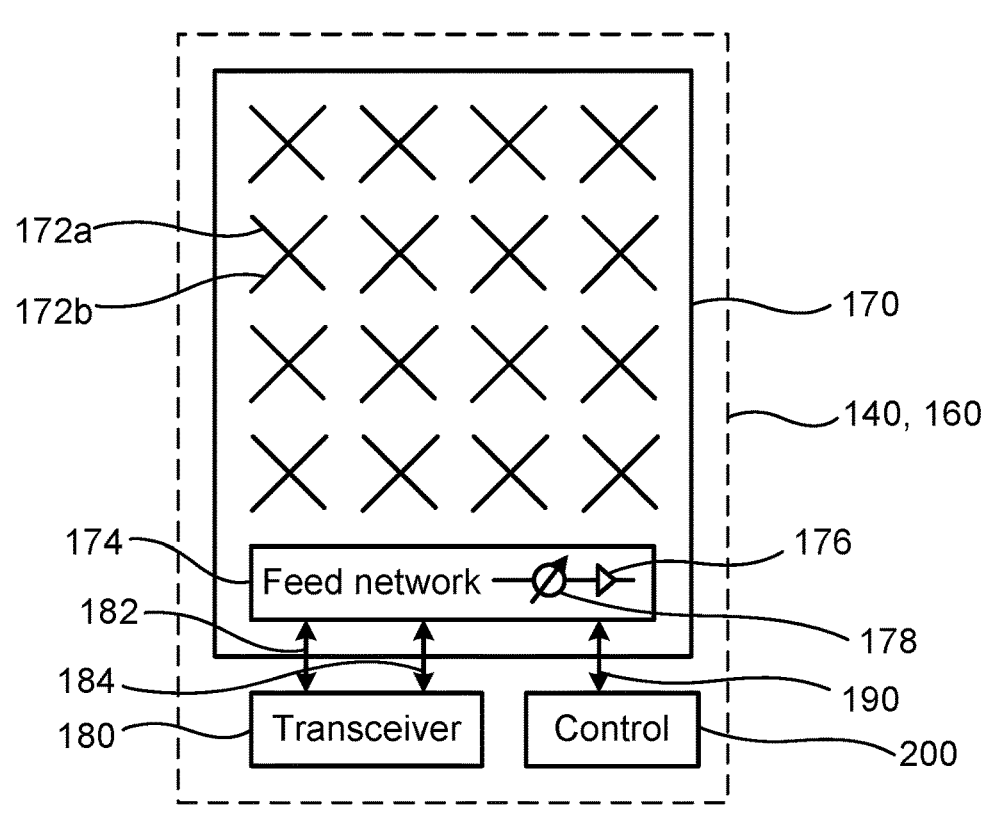
FIG. 2 schematically illustrates a dual polarized antenna array according to an embodiment.

FIG. 2 is a schematic diagram illustrating a dual polarized antenna array 170, which for example may be part of the (radio) access node 140 or the user node 160. The dual polarized antenna array 170 of FIG. 2 comprises antenna elements 172a of a first polarization and antenna elements 172*b* of a second polarization. The dual polarized antenna array 170 is accessed by a transceiver 180 via a first panel port 182 and a second panel port 184. The first panel port 182 is, via a feed network 174, connected to the antenna elements 1720 of the first polarization whilst the second panel port 184 is, via the feed network 174, connected to the antenna elements 172*b* of the second polarization. Beamforming can be enabled by applying beamforming weights in the feed network 174, where the beamforming weights are applied by changing gain values of amplifiers 176 and phases values phase shifters 178. In some examples, each antenna element 172*a*, 172*b* has its own amplifier 176 and phase shifter 178 which enables the beamforming weights to be applied per individual antenna element 172*a*, 172*b*. The beamforming weights, and thus the gain values and the phase values, are controlled by an antenna array control unit 200 which is connected to the feed network 174 via a control interface 190.

As noted above there could be difficulties to generate such wide beams, as well as other beams, that are suitable for both transmission and reception of signals.

In this respect, wider beams, for example, can in principle be generated in two different ways: either using single polarization beamforming (SPBF) or using dual polarization beamforming (DPBF).

For single polarization beamforming, a beam can be widened by applying an amplitude, and possibly also phase, taper over the antenna array of the panel antenna, with the tapering applied per polarization. As realized by the inventors, a drawback with this approach is that full power utilization for transmission cannot be obtained since some antenna branches, or elements, need to transmit with reduced power (or with attenuation if using a common power amplifier (PA)) due to the amplitude tapering. However, as also realized by the inventors. amplitude tapering does not have the same negative impact for reception of signals. Amplitude tapering implies a reduction of total transmit power since not all antenna elements transmit with full power. In general, it is difficult to generate wide beams with high PA utilization and with low gain ripple. As realized by the inventors, amplitude tapering thus leads to a loss of total transmitted power and reduced coverage of the cell-defining reference signals. Gain ripple in the beams in which the cell-defining reference signals are transmitted might increase the risk of coverage holes in certain directions and might also cause more hand-over ping-pong effects during user node mobility, causing undesired overhead signaling.

For dual polarization beamforming, antenna elements of both polarizations are used to create a wide beam. An advantage with this approach is that the desired beam shape can in many cases be obtained by phase-only tapering, which means that all PAs can transmit with full power (or that no attenuation is needed in case of a common PA). As realized by the inventors, a drawback with dual polarization beamforming for a panel architecture in which each antenna port is only connected to antenna elements of the same polarization, is that only a single beam port can be generated. However, as also realized by the inventors. this is not an issue for cell-defining reference signals such as SSB which only have one port.

Figure 3:
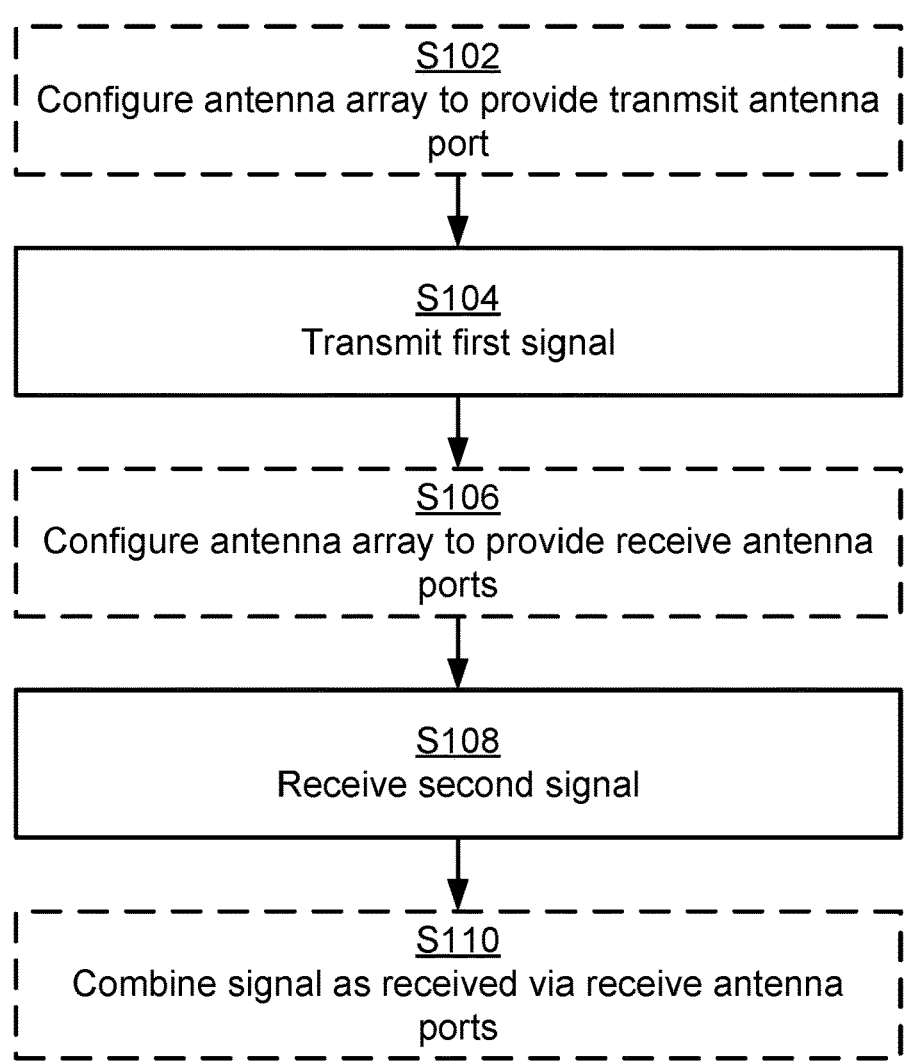
FIG. 3 is a flowchart of methods according to embodiments.

FIG. 3 is a flowchart illustrating embodiments of methods for communication in a wireless access network 100 using a dual polarized antenna array 170. The antenna array 170 comprises antenna elements 172*a*, 172*b* of a first polarization and of a second polarization. The methods are advantageously performed by the antenna array control unit 200. The methods are advantageously provided as computer programs 720.

The embodiments disclosed herein are based on using dual polarization beamforming for creating a transmit beam 150*a* with one single beam port.

S104: A first signal is transmitted via a transmit antenna port in a transmit beam 150*a* on a first link of the wireless access network 100. The transmit antenna port is connected to the antenna elements 172*a*, 172*b* of both the first polarization and the second polarization.

The embodiments disclosed herein are based on using single polarization beamforming for creating a reception beam with two beam ports, one in each of the two polarizations.

S108: A second signal is received on a second link of the wireless access network 100 via a first receive antenna port in a first receive beam 150*b* and via a second receive antenna port in a second receive beam 150*c*. The first receive antenna port is connected to antenna elements 172*a* of the first polarization and the second receive antenna port is connected to antenna elements 172*b* of the second polarization. The receive beams 150*b*, 150*c* and the transmit beam 150*a* fulfil an overlap criterion with respect to their total power patterns.

In some examples, according to the overlap criterion, at least 75% of the total power of each of the receive beams 150*b*, 150*c* are within the same angular interval as at least 75% of the total power of the transmit beam 150*a*. The angular interval encompasses the main lobe of each of the receive beams 150*b*, 150*c* and the main lobe of the transmit beam 150*a*.

In some examples, according to the overlap criterion, the variance in difference between the gain of each of the receive beams 150*b*, 150*c* and the gain of the transmit beam 150*a* is, when calculated in the decibel (dB) scale, less than 1 dB.

Two receive antenna ports with orthogonal polarizations are thus created by applying single polarization beamforming over the intrinsic polarizations of the dual polarized antenna array 170, enabling receive diversity.

The term power as used herein could have two different meanings. In one aspect, there should be as much output power from the power amplifiers as possible when generating the transmit beam 150*a*. In another aspects, for the the transmit beam 150*a*, power is summed from two orthogonal polarizations.

Embodiments relating to further details of communication in a wireless access network 100 using a dual polarized antenna array 170 as advantageously performed by the antenna array control unit 200 will now be disclosed.

In some examples, the first signal is a first one-port signal, and the second signal is a second one-port signal. However, in other examples the second signal is a two-port signal (or even an arbitrary-port signal).

Aspects of beamforming will now be disclosed.

As disclosed above, beamforming can be enabled by applying beamforming weights in the feed network 174. Hence, according to an embodiment, step S102 and step S106 are performed.

S102: The antenna array 170 is configured with a first set of beamforming weights for transmission of the first signal. The first set of beamforming weights is adapted to provide the transmit antenna port. The beamforming weights for the antenna elements 172*a* of the first polarization are different from the beamforming weights for the antenna elements 172*b* of the second polarization.

In this respect, the beamforming weights for the antenna elements 172*b* of the second polarization differ from the beamforming weights for the antenna elements 172*a* of the first polarization more than by a common phase shift (i.e., a phase shift that is common for all the antenna elements 172*b*).

S106: The antenna array 170 is configured with a second and a third set of beamforming weights for reception of the second signal. The second set of beamforming weights is adapted to provide the first receive antenna port. The third set of beamforming weights is adapted to provide the second receive antenna port. Since the first receive antenna port is connected to antenna elements 172*a* of the first polarization and the second receive antenna port is connected to antenna elements 172*b* of the second polarization, the second set of beamforming weights is applied only to the antenna elements 172*a* of the first polarization and the third set of beamforming weights is applied only to the antenna elements 172*b* of the second polarization.

There could be different ways to find the beamforming weights. In some aspects, multi-objective optimization is used to find the beamforming weights. Thus, in some embodiments, any of the first, second, or third set of beamforming weights is determined via multi-objective optimization with at least two costs. In some examples, one of the costs is maximum amount of main lobe ripple, and another of the costs is maximum sidelobe power level. Also other techniques, possible with other costs, can be used to find the beamforming weights.

In some embodiments, the first set of beamforming weights all have equal amplitude. For example, all phase-only tapering can be used wherein the first set of beamforming weights all have unit amplitude.

Aspects of reception of the second signal will now be disclosed.

In some aspects, a combination of received signals is formed for utilization of receiver diversity. Hence, according to an embodiment, step S110 is performed.

S110: The second signal as received via the first receive antenna port is combined with the second signal as received via the second receive antenna port.

In some aspects, the combining is based on received signal quality on the first receive antenna port in relation to received signal quality on the second receive antenna port.

There could be different ways in which the second signal as received via the first receive antenna port is combined with the second signal as received via the second receive antenna port. In some embodiments, the combining is maximum ratio combining (MRC). Thus, for reception, the transceiver 180 might perform polarization matching of the received signals by using, e.g., MRC.

Embodiments where the antenna array 170 and the antenna array control unit 200 are part of an access node 140 will now be disclosed. In these embodiments the first link is a downlink and the second link is an uplink. There could be different first signals that are transmitted in step S104. In some non-limiting examples, the first signal comprises any of: an SSB, a msg2 message, a contention resolution grant, a data message. There could be different second signals that are received in step S108. In some non-limiting examples, the second signal comprises any of: an SSB report, a Random Access (RA) message, a msg3 message, a contention resolution message, a data message.

Embodiments where the antenna array 170 and the antenna array control unit 200 are part of a user node 160 will now be disclosed. In these embodiments the first link is an uplink and the second link is a downlink. There could be different first signals that are transmitted in step S104. In some non-limiting examples, the first signal is any of: a Physical Uplink Control CHannel (PUCCH) message, a one-port Sounding Reference Signal (SRS), a fixed rank-1 Physical Uplink Shared CHannel (PUSCH) transmission message. There could be different second signals that are received in step S108. In some non-limiting examples, the second signal comprises any of: a Physical Downlink Control CHannel (PDCCH) transmission, a Physical Downlink Shared CHannel (PDSCH) transmission, a Channel State Information Reference Signal (CSI-RS) transmission (including Tracking Reference Signal (TRS)), a Phase Tracking Reference Signal (PTRS) transmission, a Demodulation Reference Signal (DMRS) transmission.

Figure 4:
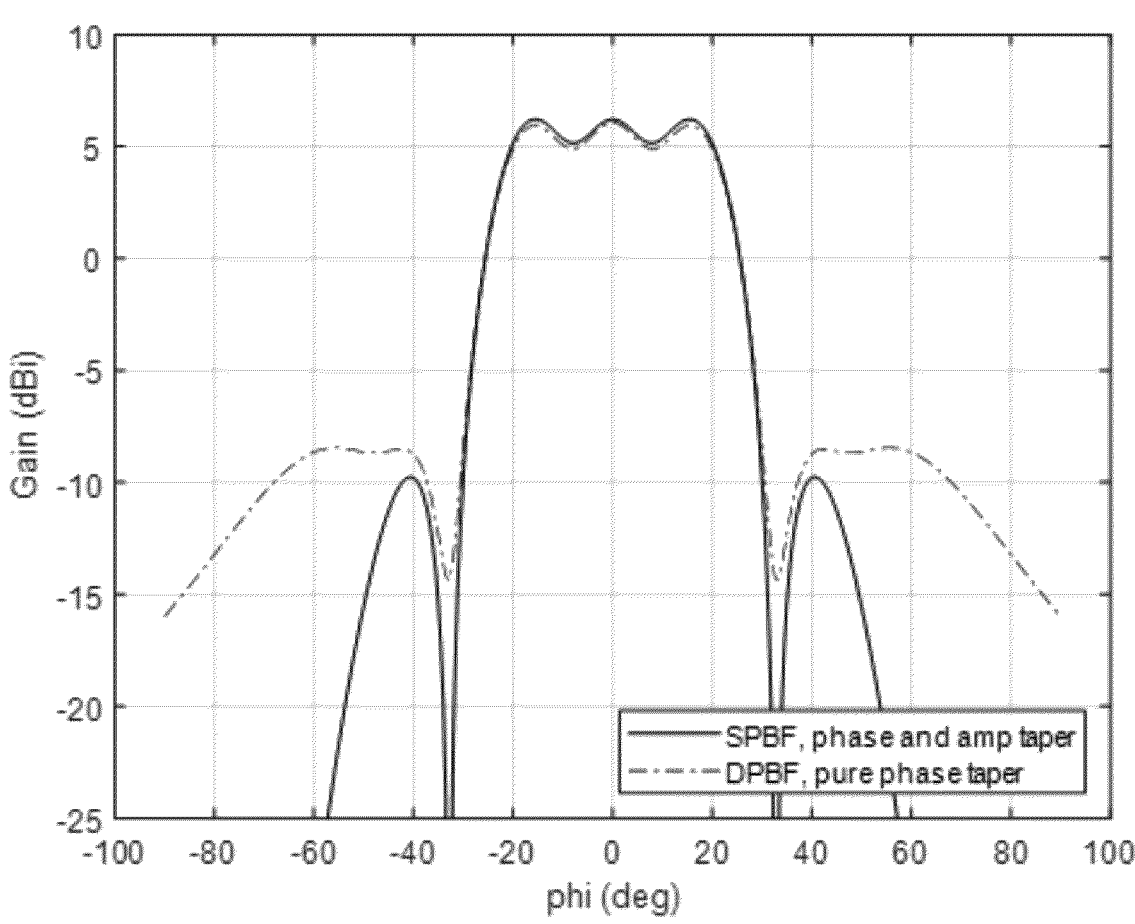
FIG. 4 shows examples of total power patterns according to an embodiment.

FIG. 4 shows an example where the total power pattern for beams generated using single polarization beamforming (SPBF) is compared to the total power pattern for beams generated using dual polarization beamforming (DPBF). FIG. 4 shows the total power patterns in the azimuth dimension. The beams were designed to cover a certain angular sector. Only phase tapering was used for the beams generated using dual polarization beamforming. The beamforming weights for the beams generated using dual polarization beamforming were found via a multi-objective optimization with two costs; the ripple in the main beam direction and the other being sidelobe level overshooting a desired level. The ripple could be reduced further by applying a higher cost on ripple in the optimization. In order to take the effect of amplitude tapering into account, the two total power patterns were directivity normalized to take the total transmitted power into account. This means that the difference in power amplifier power, being 3.6 dB lower for SPBF compared to DPBF, is not reflected in the figure. The shape of the main lobe of the beams generated using dual polarization beamforming is similar to the shape of the main lobe of the beams generated using single polarization beamforming. Hence, there is a good match between the beams used for transmission and reception, respectively. The example in FIG. 4 shows that it is indeed possible to generate beams using dual polarization beamforming and single polarization beamforming where the main lobes have the same shape.

Figure 5:
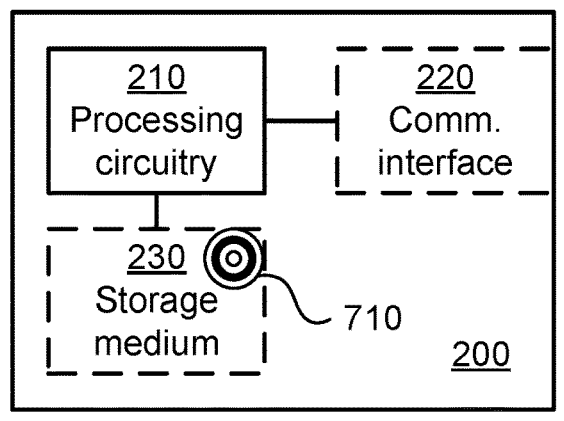
FIG. 5 is a schematic diagram showing functional units of an antenna array control unit according to an embodiment.

FIG. 5 schematically illustrates, in terms of a number of functional units, the components of an antenna array control unit 200 according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the antenna array control unit 200 to perform a set of operations, or steps, as disclosed above. For example, the storage medium 230 may store the set of operations, and the processing circuitry 210 may be configured to retrieve the set of operations from the storage medium 230 to cause the antenna array control unit 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The antenna array control unit 200 may further comprise a communications interface 220 at least configured for communications with other entities, functions, nodes, and devices, such as the dual polarized antenna array 170. As such the communications interface 220 may comprise one or more transmitters and receivers, comprising analogue and digital components. The processing circuitry 210 controls the general operation of the antenna array control unit 200 e.g. by sending data and control signals to the communications interface 220 and the storage medium 230, by receiving data and reports from the communications interface 220, and by retrieving data and instructions from the storage medium 230. Other components, as well as the related functionality, of the antenna array control unit 200 are omitted in order not to obscure the concepts presented herein.

Figure 6:
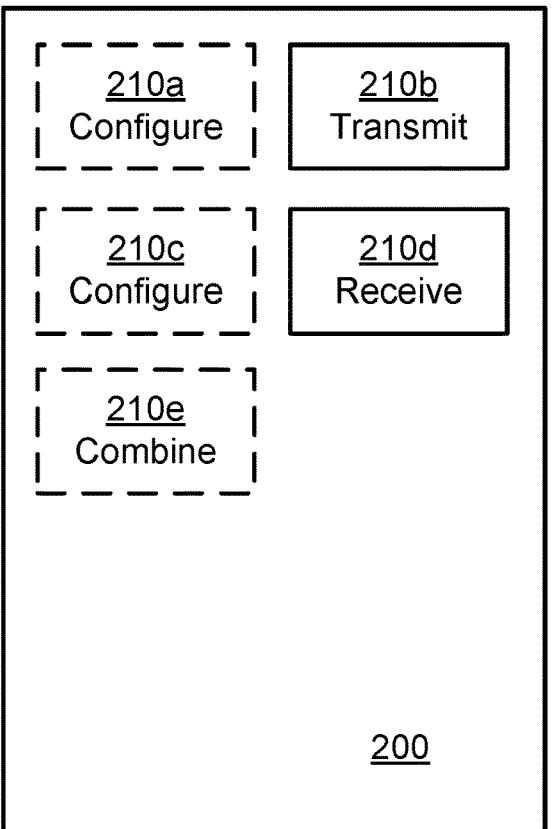
FIG. 6 is a schematic diagram showing functional modules of an antenna array control unit according to an embodiment.

FIG. 6 schematically illustrates, in terms of a number of functional modules, the components of an antenna array control unit 200 according to an embodiment. The antenna array control unit 200 of FIG. 6 comprises a number of functional modules; a transmit module 210*b* configured to perform step S104, and a receive module 210*d* configured to perform step S108. The antenna array control unit 200 of FIG. 6 may further comprise a number of optional functional modules, such as any of a configure module 210*a* configured to perform step S102, a configure module 210*c* configured to perform step S106, and a combine module 210*e* configured to perform step S110. In general terms, each functional module 210*a*:210*e* may in one embodiment be implemented only in hardware and in another embodiment with the help of software, i.e., the latter embodiment having computer program instructions stored on the storage medium 230 which when run on the processing circuitry makes the antenna array control unit 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210*a*:210*e* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*:210*e* and to execute these instructions, thereby performing any steps as disclosed herein.

The antenna array control unit 200 may be provided as a standalone device or as a part of at least one further device. For example, the antenna array control unit 200 may be provided in a (radio) access node 140 or in a user node 160. Alternatively, functionality of the antenna array control unit 200 may be distributed between at least two devices, or nodes. A first portion of the instructions performed by the antenna array control unit 200 may be executed in a first device, and a second portion of the of the instructions performed by the antenna array control unit 200 may be executed in a second device; the herein disclosed embodiments are not limited to any particular number of devices on which the instructions performed by the antenna array control unit 200 may be executed. Hence, the methods according to the herein disclosed embodiments are suitable to be performed by an antenna array control unit 200 residing in a cloud computational environment. Therefore, although a single processing circuitry 210 is illustrated in FIG. 5 the processing circuitry 210 may be distributed among a plurality of devices, or nodes. The same applies to the functional modules 210*a*:210*e* of FIG. 6 and the computer program 720 of FIG. 7.

Figure 7:
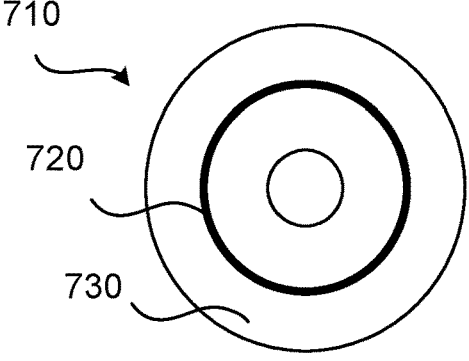
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

Figure 8:
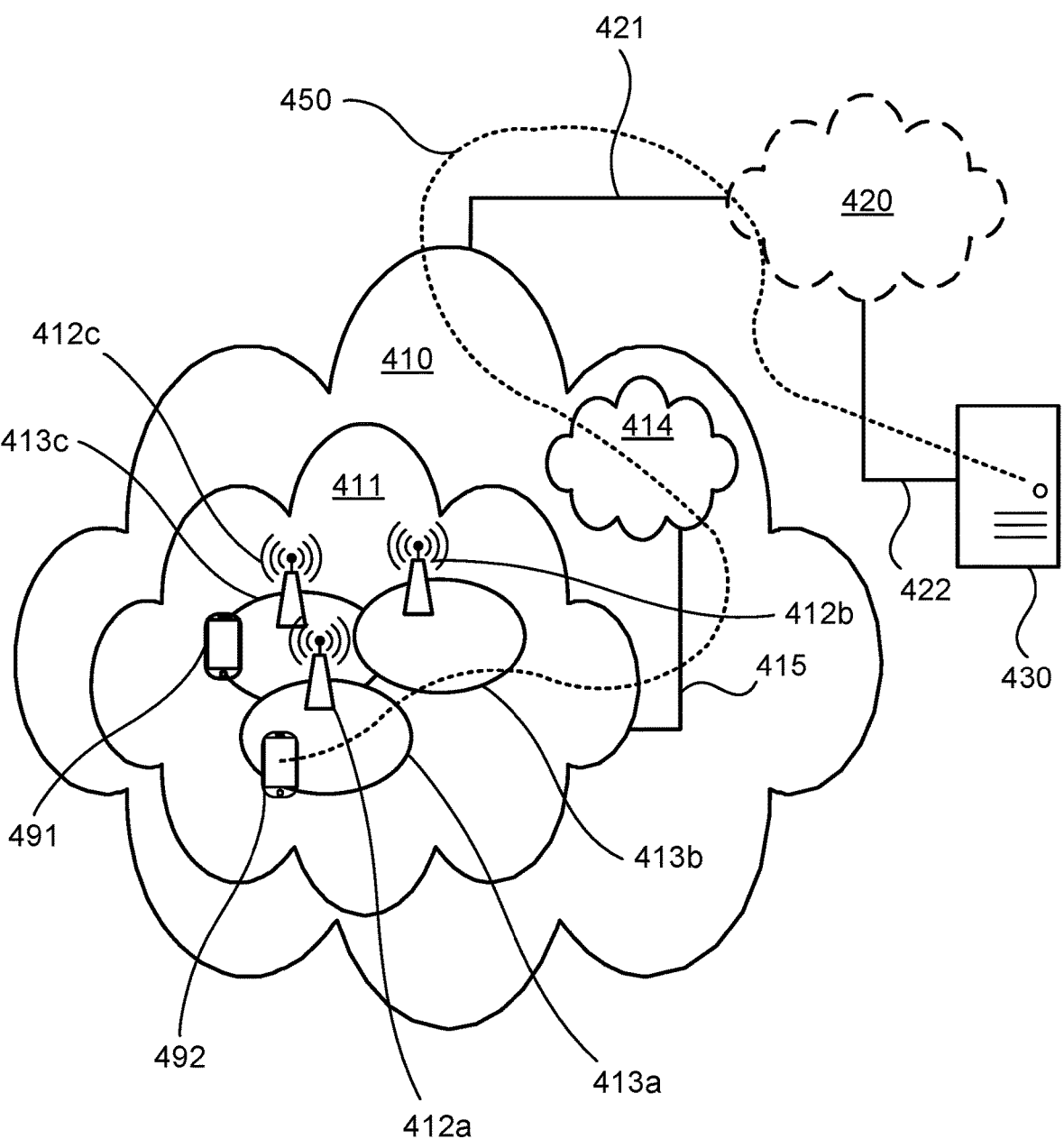
FIG. 8 is a schematic diagram illustrating a telecommunication network connected via an intermediate network to a host computer in accordance with some embodiments.

FIG. 8 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as (radio) access network 110 in FIG. 1, and core network 414, such as core network 120 in FIG. 1. Access network 411 comprises a plurality of radio access network nodes 412*a*, 412*b*, 412*c*, such as NBs, eNBs, gNBs (each corresponding to the (radio) access node 140 of FIG. 1) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the wireless device 160 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 9:
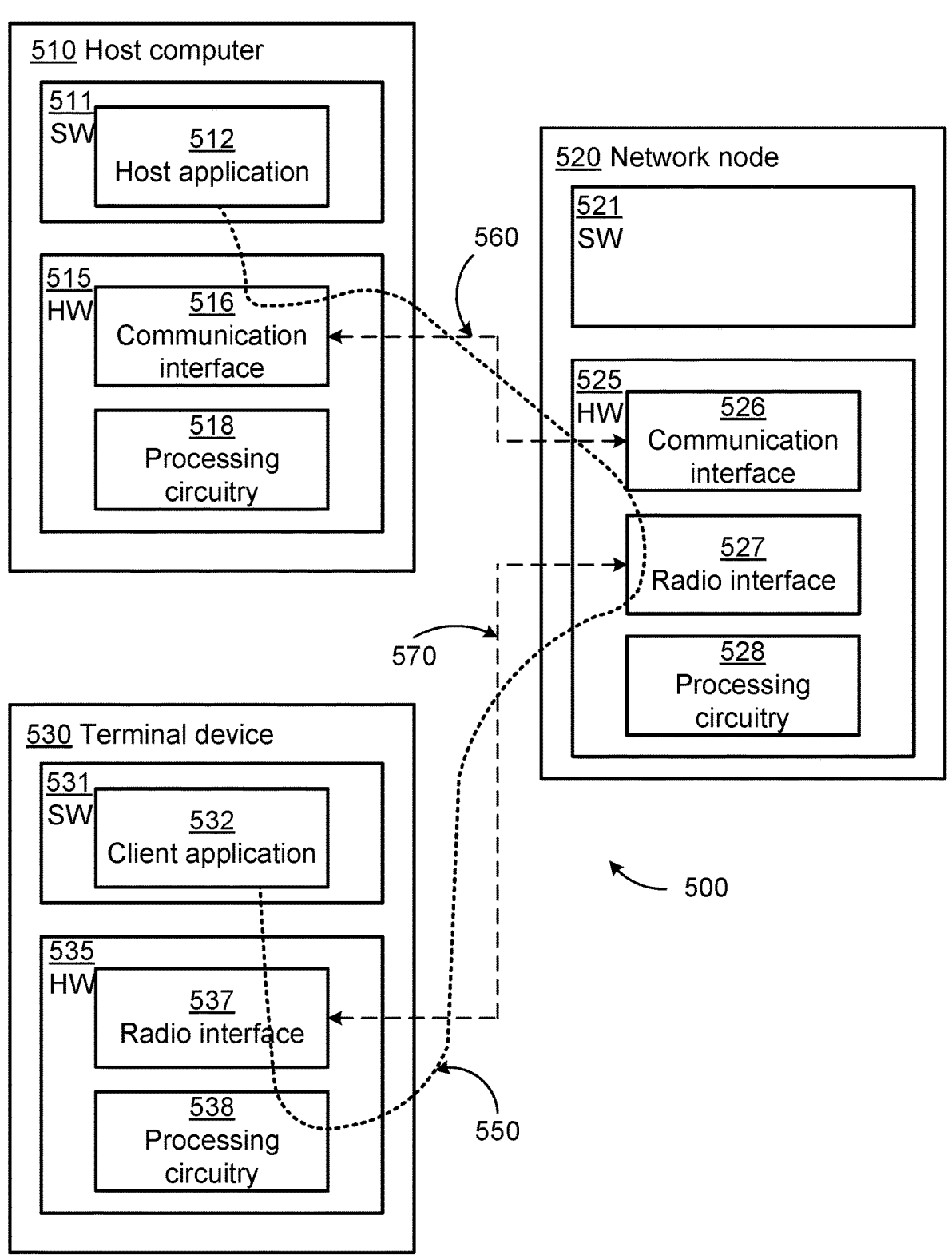
FIG. 9 is a schematic diagram illustrating host computer communicating via a radio base station with a terminal device over a partially wireless connection in accordance with some embodiments.

FIG. 9 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the user node 160 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the (radio) access node 140 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by radio access network node 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 9 may be similar or identical to host computer 430, one of network nodes 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for communication in a wireless access network a dual polarized antenna array, the antenna array comprising antenna elements of a first polarization and of a second polarization, the method comprising:

transmitting a first signal via a transmit antenna port in a transmit beam on a first link of the wireless access network, wherein the transmit antenna port is connected to the antenna elements of both the first polarization and the second polarization, and the transmit beam utilizes the antenna elements of both the first polarization and the second polarization;

receiving a second signal on a second link of the wireless access network via a first receive antenna port in a first receive beam and via a second receive antenna port in a second receive beam; and combining the second signal as received via the first receive antenna port in the first receive beam with the second signal as received via the second receive antenna port in the second receive beam, wherein the first receive antenna port is connected to antenna elements of the first polarization, the first receive antenna port is not connected to any antenna element of the second polarization, the second receive antenna port is connected to antenna elements of the second polarization, the second receive antenna port is not connected to any antenna element of the second polarization, at least 75% of the total power of the transmit beam is within a first angular interval, at least 75% of the total power of the first receive beam is within the first angular interval, at least 75% of the total power of the second receive beam is within the first angular interval, the transmit beam has a main lobe, the first receive beam has a main lobe, the second receive beam has a main lobe, and the first angular interval encompasses: i) the main lobe of the transmit beam, ii) the main lobe of the first receive beam, and iii) the main lobe of the second receive beam.

2. The method of claim 1, further comprising:

configuring the antenna array with a first set of beamforming weights for transmission of the first signal, wherein the first set of beamforming weights is adapted to provide the transmit antenna port, and wherein the beamforming weights for the antenna elements of the first polarization are different from the beamforming weights for the antenna elements of the second polarization; and configuring the antenna array with a second and a third set of beamforming weights for reception of the second signal, wherein the second set of beamforming weights is adapted to provide the first receive antenna port, and wherein the third set of beamforming weights is adapted to provide the second receive antenna port.

3. The method of claim 2, wherein any of the first, second, or third set of beamforming weights is determined via multi-objective optimization with at least two costs.

4. The method of claim 3, wherein one of the costs is maximum amount of main lobe ripple, and another of the costs is maximum sidelobe power level.

5. The method of claim 2, wherein the first set of beamforming weights all have equal amplitude.

6. The method of claim 1, wherein the combining is based on received signal quality on the first receive antenna port in relation to received signal quality on the second receive antenna port.

7. The method of claim 1, wherein the combining is maximum ratio combining.

8. The method of claim 1, wherein the first signal is a first one-port signal, and the second signal is a second one-port signal.

9. The method of claim 1, wherein the method is performed by an antenna array control unit.

10. The method of claim 9, wherein the antenna array and the antenna array control unit are part of an access node.

11. The method of claim 10, wherein the first link is a downlink and the second link is an uplink.

12. The method of claim 11, wherein the first signal comprises any of: a synchronization signal block (SSB), a msg2 message, a contention resolution grant, a data message.

13. The method of claim 11, wherein the second signal comprises any of: a synchronization signal block (SSB) report, a random access (RA) message, a msg3 message, a contention resolution message, a data message.

14. The method of claim 9, wherein the antenna array and the antenna array control unit are part of a user node.

15. The method of claim 14, wherein the first link is an uplink and the second link is a downlink, and the first signal is any of: a physical uplink control channel (PUCCH) message, a one-port sounding reference signal (SRS), a fixed rank-1 physical uplink shared channel (PUSCH) transmission message.

16. The method of claim 14, wherein the first link is an uplink and the second link is a downlink, and the second signal is any of: a physical downlink control channel (PDCCH) transmission, a physical downlink shared channel (PDSCH) transmission, a channel state information reference signal (CSI-RS) transmission, a phase tracking reference signal (PTRS) transmission, a demodulation reference signa (DMRS) transmission.

17. An antenna array control unit for communication in a wireless access network utilizing a dual polarized antenna array, the antenna array comprising antenna elements of a first polarization and of a second polarization, the antenna array control unit comprising processing circuitry, the processing circuitry being configured to cause the antenna array control unit to:

transmit a first signal via a transmit antenna port in a transmit beam on a first link of the wireless access network, wherein the transmit antenna port is connected to the antenna elements of both the first polarization and the second polarization, and the transmit beam utilizes the antenna elements of both the first polarization and the second polarization;

receive a second signal on a second link of the wireless access network via a first receive antenna port in a first receive beam and via a second receive antenna port in a second receive beam; and combine the second signal as received via the first receive antenna port in the first receive beam with the second signal as received via the second receive antenna port in the second receive beam, wherein the first receive antenna port is connected to antenna elements of the first polarization, the first receive antenna port is not connected to any antenna element of the second polarization, the second receive antenna port is connected to antenna elements of the second polarization, the second receive antenna port is not connected to any antenna element of the second polarization, at least 75% of the total power of the transmit beam is within a first angular interval, at least 75% of the total power of the first receive beam is within the first angular interval, at least 75% of the total power of the second receive beam is within the first angular interval, the transmit beam has a main lobe, the first receive beam has a main lobe, the second receive beam has a main lobe, and the first angular interval encompasses: i) the main lobe of the transmit beam, ii) the main lobe of the first receive beam, and iii) the main lobe of the second receive beam.

18. A non-transitory computer readable storing medium storing a computer program for communication in a wireless access network utilizing a dual polarized antenna array, the antenna array comprising antenna elements of a first polarization and of a second polarization, the computer program comprising computer code which, when run on processing circuitry of an antenna array control unit causes the antenna array control unit to:

transmit a first signal via a transmit antenna port in a transmit beam on a first link of the wireless access network, wherein the transmit antenna port is connected to the antenna elements of both the first polarization and the second polarization, and the transmit beam utilizes the antenna elements of both the first polarization and the second polarization;

receive a second signal on a second link of the wireless access network via a first receive antenna port in a first receive beam and via a second receive antenna port in a second receive beam; and combine the second signal as received via the first receive antenna port in the first receive beam with the second signal as received via the second receive antenna port in the second receive beam, wherein the first receive antenna port is connected to antenna elements of the first polarization, the first receive antenna port is not connected to any antenna element of the second polarization, the second receive antenna port is connected to antenna elements of the second polarization, the second receive antenna port is not connected to any antenna element of the second polarization, at least 75% of the total power of the transmit beam is within a first angular interval, at least 75% of the total power of the first receive beam is within the first angular interval, at least 75% of the total power of the second receive beam is within the first angular interval, the transmit beam has a main lobe, the first receive beam has a main lobe, the second receive beam has a main lobe, and the first angular interval encompasses: i) the main lobe of the transmit beam, ii) the main lobe of the first receive beam, and iii) the main lobe of the second receive beam.

* * * * *